(12) United States Patent
Belkerdid et al.

(10) Patent No.: US 9,404,810 B2
(45) Date of Patent: Aug. 2, 2016

(54) WIRELESS SURFACE ACOUSTIC WAVE TEMPERATURE SENSOR AND INTERROGATION SYSTEM APPARATUS CAPABLE OF GENERATING A SELF SYNCHRONIZING SHAFT POSITION INDICATOR FOR MOVING PLATFORMS

(71) Applicant: Mnemonics, Inc., Melbourne, FL (US)

(72) Inventors: Madjid A. Belkerdid, Casselberry, FL (US); Ed Struble, Satellite Beach, FL (US); Nicholas Kozlovski, Winter Springs, FL (US)

(73) Assignee: Mnemonics, Inc., Melbourne, FL (US)

( * ) Notice: Subject to any disclaimer, the term of this patent is extended or adjusted under 35 U.S.C. 154(b) by 0 days.

(21) Appl. No.: 14/686,016

(22) Filed: Apr. 14, 2015

(65) Prior Publication Data

US 2016/0012265 A1     Jan. 14, 2016

Related U.S. Application Data

(60) Provisional application No. 61/980,553, filed on Apr. 16, 2014.

(51) Int. Cl.

| | |
|---|---|
| *H04Q 5/22* | (2006.01) |
| *G01R 13/30* | (2006.01) |
| *G01H 1/00* | (2006.01) |
| *H01L 41/00* | (2013.01) |
| *G01K 11/26* | (2006.01) |
| *G06K 19/067* | (2006.01) |

(52) U.S. Cl.
CPC .......... *G01K 11/265* (2013.01); *G06K 19/0675* (2013.01)

(58) Field of Classification Search
CPC .................. G06K 7/10425; G01K 11/265
USPC ............................................ 340/10.1
See application file for complete search history.

(56) References Cited

U.S. PATENT DOCUMENTS

| | | | | |
|---|---|---|---|---|
| 3,504,279 A | * | 3/1970 | Foster | G01B 7/28 324/601 |
| 4,167,120 A | * | 9/1979 | Shaw | G01P 3/44 73/504.01 |
| 4,384,409 A | * | 5/1983 | Lao | G01P 3/44 310/313 R |
| 4,574,291 A | * | 3/1986 | Wimmer | B41J 11/42 346/138 |
| 5,627,444 A | | 5/1997 | Fulks | |
| 6,060,815 A | | 5/2000 | Nysen | |
| 6,992,547 B2 | | 1/2006 | Bergmann | |

(Continued)

*Primary Examiner* — Jennifer Mehmood
*Assistant Examiner* — John Mortell
(74) *Attorney, Agent, or Firm* — John L. DeAngelis; Beusse Wolter Sanks & Maire, PPLC.

(57) ABSTRACT

A surface acoustic wave sensor system for use with a moving platform. The system comprises an interrogator for producing an RF interrogating signal transmitted from a first antenna. A substrate that supports surface acoustic waves is attached to the moving platform and an interdigital transducer (IDT) and reflector are mounted on the substrate. The IDT produces surface acoustic waves (SAW) responsive to the RF interrogating signal. The reflector produces reflected SAW responsive to the incident SAW and responsive to a characteristic of the moving platform. A position indicator produces a synchronization signal input to the interrogator for triggering the RF interrogating signal. The synchronization signal is timed to trigger the RF interrogating signal when the interdigital transducer is within a field-of-view of the first antenna.

16 Claims, 8 Drawing Sheets

(56) References Cited

U.S. PATENT DOCUMENTS

| | | | |
|---|---|---|---|
| 7,023,200 B2 * | 4/2006 | Spellman, Jr. | G01D 5/145 324/207.2 |
| 7,053,534 B2 * | 5/2006 | Tomikawa | G01C 19/5607 310/313 R |
| 7,642,898 B1 | 1/2010 | Malocha et al. | |
| 8,256,289 B2 * | 9/2012 | Kano | G01C 19/5698 73/504.01 |
| 8,260,204 B2 * | 9/2012 | Edmonson | G01S 13/755 333/150 |
| 2005/0017602 A1 | 1/2005 | Arms et al. | |

\* cited by examiner

WIRELESS SURFACE ACOUSTIC WAVE TEMPERATURE SENSOR AND INTERROGATION SYSTEM APPARATUS CAPABLE OF GENERATING A SELF SYNCHRONIZING SHAFT POSITION INDICATOR FOR MOVING PLATFORMS

CROSS REFERENCE TO RELATED APPLICATION

This patent application claims benefit of the Apr. 16, 2014 filing date of provisional patent application No. 61/980,553, which is incorporated by reference herein in its entirety.

FIELD

This invention relates to passive wireless SAW temperature sensors for measuring the temperature of rotating platforms and its angular velocity (a vector quantity related to the time rate of change of angular position of a rotating body, as distinguished from the scalar quantity of rotational speed of the rotating body), where the rotating sensors are only visible to the interrogating antenna at regular or irregular intervals and where the angular velocity can be either variable or constant.

BACKGROUND

Devices such as optical, mechanical, electrical, and magnetic tachometers are used in the prior art to synchronize the interrogating signal and the rotating temperature sensors that must receive the signal. In many cases however a tachometer is not available or cannot be used because of unfavorable environmental and physical conditions.

For example, sensors can be placed on a gear inside a gear box where an interrogating antenna is stationary inside the gear box. As the gear rotates the sensors move into proximate relationship to the rotating sensor(s). The interrogating antenna is connected to an RF (radio frequency) interrogator, i.e., the device that issues the interrogating RF signal, with an RF feed through a hole in the gear box housing. The space between the gear and the gear box housing is limited and thus the interrogating antenna and the rotating sensor(s) are in a line-of-sight orientation only once during each revolution. This line-of-sight alignment is of course a random event, may change every revolution, and is not possible unless the interrogator has information related to the position of the rotating sensor. When a tachometer is not available such a wireless temperature sensing system is not reliable.

Another disadvantage of prior art shaft position sensors is their susceptibility to wear, tear, and misalignment, thereby reducing the reliability and integrity of the temperature sensing system.

A prior art SAW system comprises an interrogator further comprising a transmitter, receiver, and stationary antenna. The transmitter generates an RF interrogating signal or pulse at a SAW synchronous frequency or frequencies with an appropriate bandwidth and power level. The interrogating signal is directed toward the SAW substrate on which are mounted a SAW transducer and a reflector array. The transducer receives the interrogating RF signal at the SAW antenna, launches surface acoustic waves responsive thereto, receives reflected surface acoustic waves produced by a reflector array, and generates an RF echo signal or pulse responsive to the reflected surface acoustic waves. The RF echo signal is transmitted back to the interrogator via the SAW antenna where the receiver component detects and processes the echoes.

Figure 1:
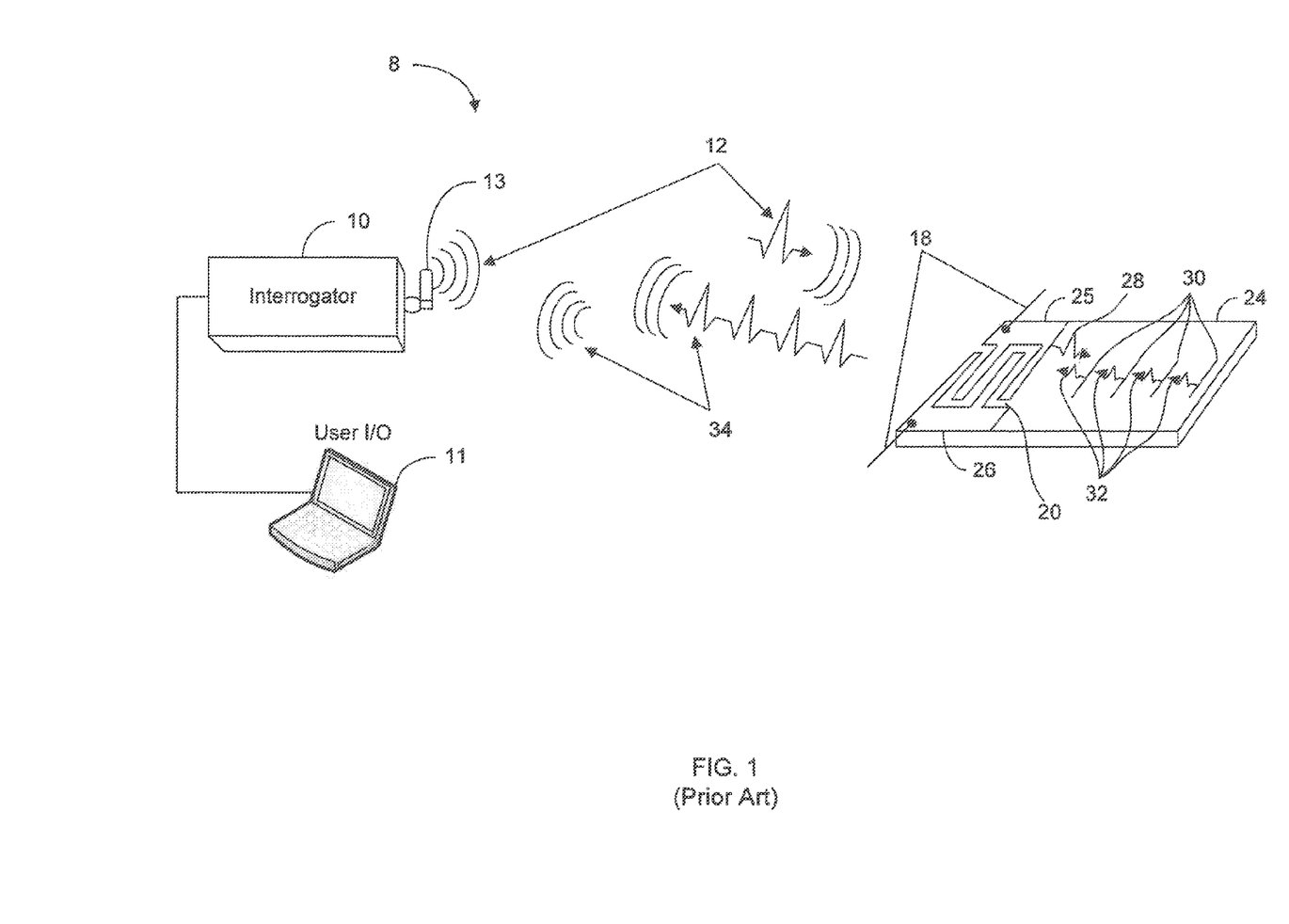
FIG. 1 illustrates a passive wireless SAW sensor system of the prior art.

FIG. 1 depicts such a prior art SAW sensor system 8. An interrogator 10, under control of a user controller 11, generates and transmits an RF interrogating signal 12 from an antenna 13.

The RF interrogating signal is received by an antenna 18 connected to an interdigital transducer (IDT) 20 disposed on a piezoelectric substrate 24. The IDT 20 typically comprises positive electrodes connected to a positive bus bar 25 and negative electrodes connected to a negative bus bar 26. Terminals of the antenna 18 are connected to the positive and negative bus bars 25 and 26. Responsive to the RF interrogating signal, the IDT 20 launches incident surface acoustic waves (SAW) 28 onto the piezoelectric substrate 24. The SAW is launched from both sides of the IDT 20 and travels along the surface of the piezoelectric substrate 24. In FIG. 1 the SAW propagates in only one direction.

A reflector bank 30 (comprising a pattern of metal electrodes that are also referred to as elements or reflectors) some distance from the IDT 20 on one side (as illustrated in FIG. 1) or both sides of the IDT 20 generates reflected surface acoustic waves 32 back to the IDT 20 where they are converted to an RF echo signal 34 that is transmitted from the antenna 18 to the interrogator 10 for processing. The reflector bank 30 can launch a single frequency echo as used in a CDMA RFID (code division multiple access radio frequency identification) tag system or multiple frequencies such as used in an OFC system. Generally, the characteristics of the echo or reflected SAW are representative of physical parameters of the reflector array. For example, spacing of the reflectors of the reflector array, which affect the frequency and/or phase of the reflected SAW signal, are affected by a temperature of the substrate, which may in turn be affected by an ambient temperature of the region surrounding the SAW device.

Figure 2:
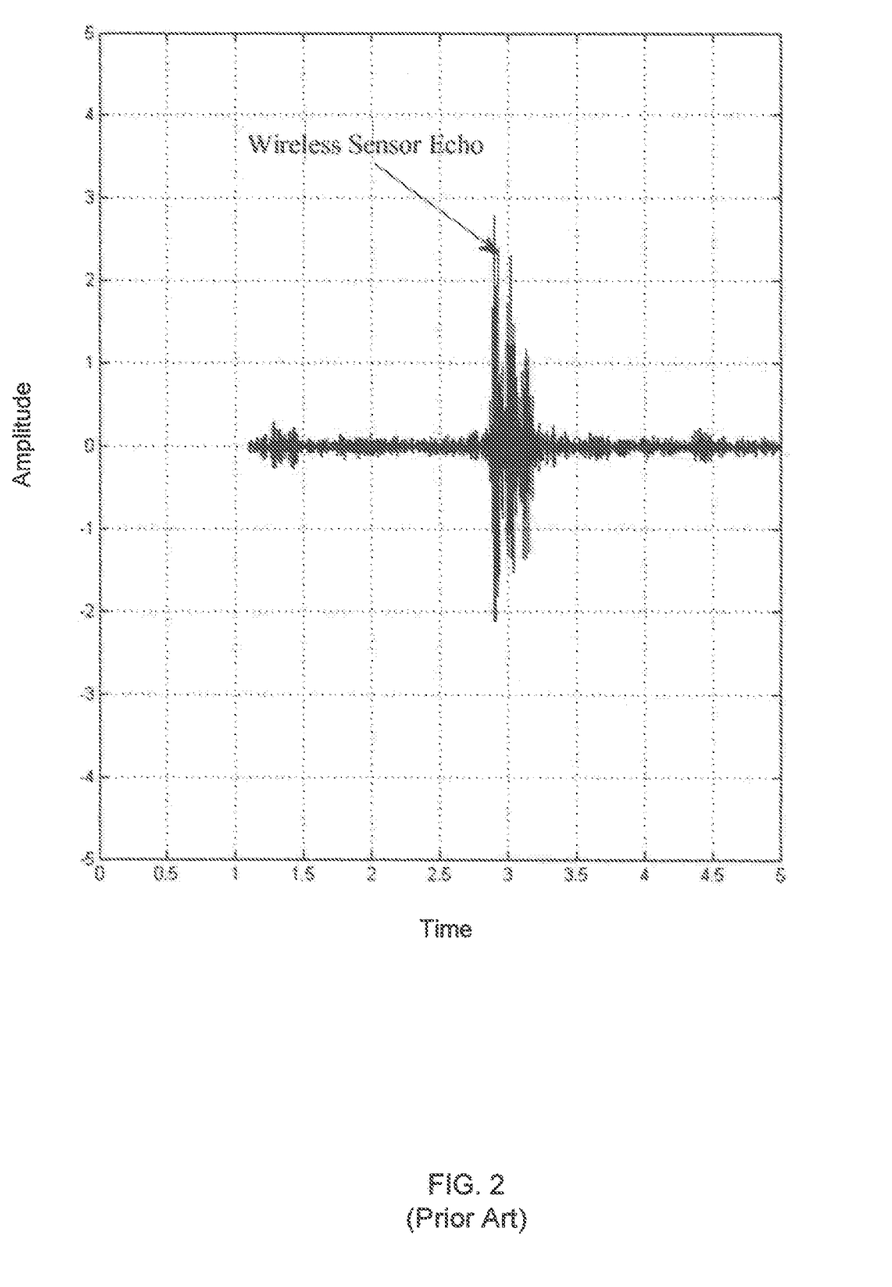
FIG. 2 illustrates an RF echo signal as retransmitted by a passive SAW sensor of FIG. 1.

FIG. 2 illustrates a prior art RF echo signal as generated by the SAW sensor system 8 of FIG. 1. Signal peaks represent the echo from each reflector bank, thus FIG. 2 depicts the echoes of a SAW sensor having three reflector banks.

In one embodiment of a SAW sensor, the substrate is bonded to a header material with bond wires connecting the SAW components to pins on the header. The SAW sensor further comprises a header lid for covering the SAW components.

Figure 3:
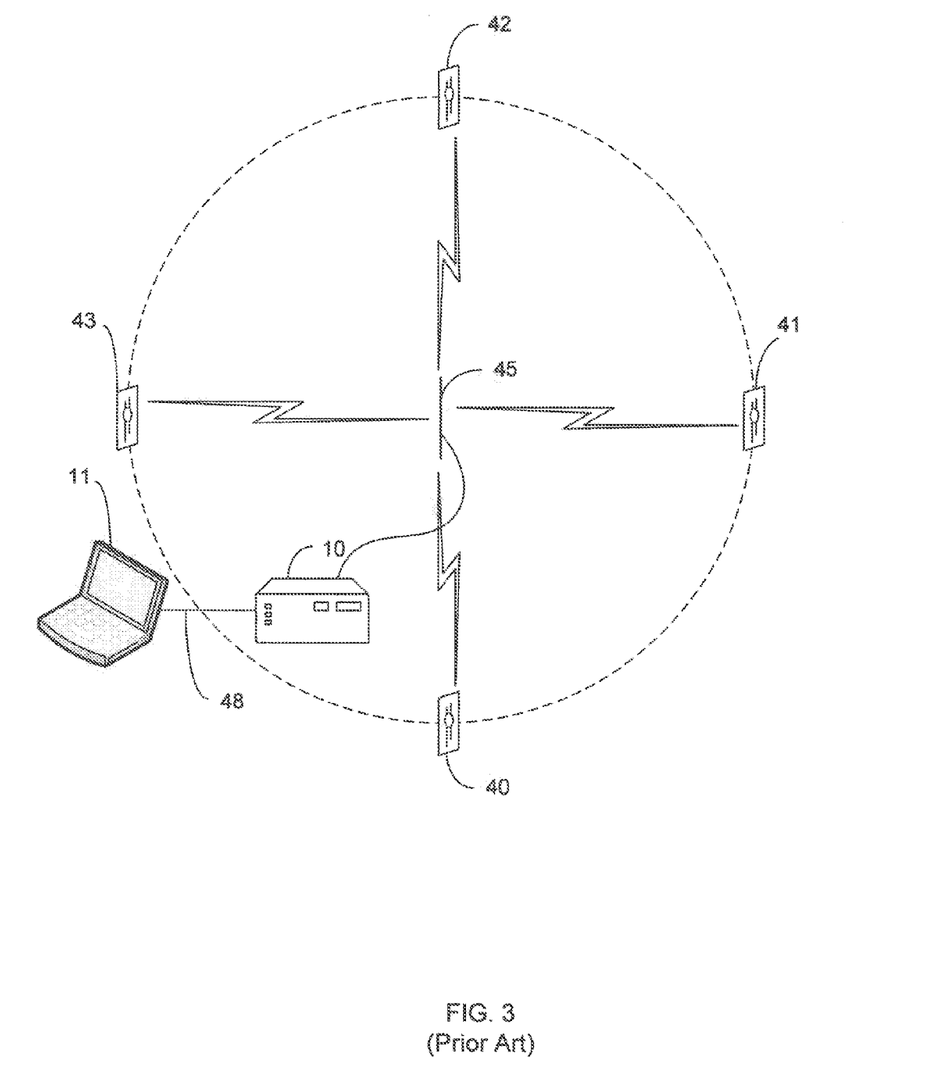
FIG. 3 illustrates a prior art multi-sensor passive wireless SAW sensor system comprising four SAW sensors.

FIG. 3 illustrates a prior art SAW sensor system comprising four SAW sensors 40-43 with RF interrogating signals generated by the interrogator 10, transmitted from a monopole antenna 45, and received by each of the SAW sensors 40-43. The user controller 11 communicates with the interrogator 10 over an Ethernet link 48.

Figure 4:
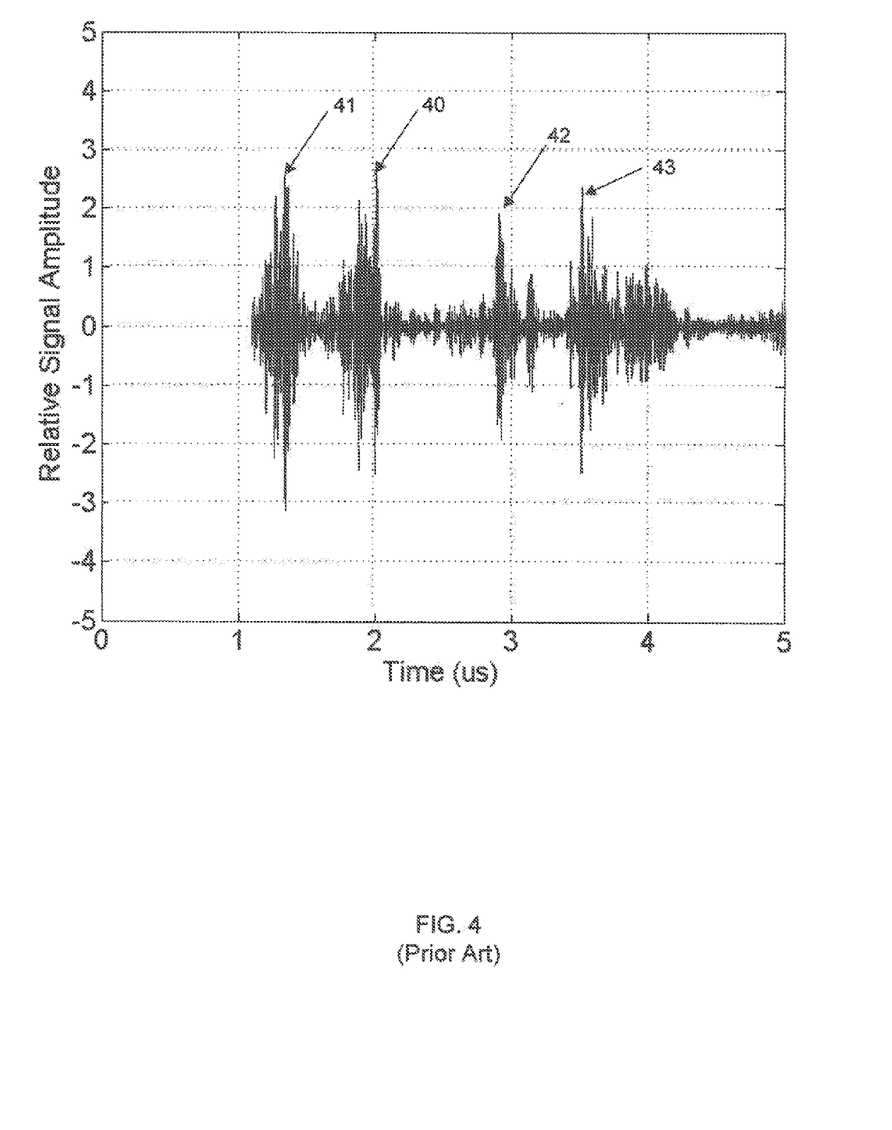
FIG. 4 illustrates the RF echo signals from the four sensor system of FIG. 3.

FIG. 4 depicts the echoes from each sensor of the four-sensor system of FIG. 3, each echo or reflection labeled with the reference numeral of the sensor system that generated the echo.

In lieu of using a monopole or dipole antenna, such as the antennas 13 and 45 of FIGS. 1 and 3, respectively, a patch antenna can be used. The patch antenna and the SAW substrate may be mounted on the same supporting material with the patch antenna proximate the SAW substrate.

BRIEF DESCRIPTION OF THE FIGURES

The invention is explained in the following description in view of the drawings.

DETAILED DESCRIPTION

Before describing in detail the particular method and apparatus related to a SAW sensor system for determining temperature of a rotating platform and/or the angular velocity of the platform, it should be observed that the embodiments of the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits of the structure or method of the invention, but only to provide exemplary constructions. The embodiments are permissive rather than mandatory and illustrative rather than exhaustive.

As described above, surface acoustic wave (SAW) sensors have been successfully used as temperature sensors. These devices are based on either wideband operation using a bank of reflector arrays that use either the CDMA or the OFC type, or a narrow band resonator type.

In all cases the RF interrogating signal triggers the launching of the incident surface acoustic waves from the IDT and the echo returns from either the reflector banks or the resonators carry information related to a temperature at the location of the SAW sensor.

Generally when used in the present application a SAW device comprises the substrate, IDT, bus bars and reflectors. A packaged SAW device comprises a SAW device and its cover. A SAW sensor comprises a packaged SAW device and its antenna for receiving the RF interrogating signal and for transmitting an RF signal representative of the reflected surface acoustic waves.

In some applications the packaged SAW device is physically attached to an RF antenna that receives the RF interrogating signal. This configuration is not required, but may minimize the space occupied by the SAW sensor. Small and compact antennas, such as a dipole, monopole, or patch antenna, are typically used for sensor applications.

A simple dipole antenna built on an FR4 printed circuit board substrate using a wet etch process provides the SAW sensor with a good mechanical and RF interconnection to the antenna via its terminal pads.

In applications where the packaged SAW device is too close to a metal surface or attached to a stationary or rotating metal platform, a small patch antenna may be used with the packaged SAW device attached (for example using an epoxy adhesive) to the patch antenna. The IDT bus bars (the inputs) are wire-bonded directly to the patch antenna before encapsulation of the sensor. The present invention relates to, but is not restricted to SAW temperature sensors for use with patch antennas.

In certain applications the SAW sensor(s) is/are mounted on a rotating platform and the interrogating antenna is mounted on a stationary platform facing the rotating platform to permit the RF interrogating signal to illuminate the sensors as they rotate, i.e., the sensors are within a field-of-view of the interrogating antenna and the RF interrogating signal that it transmits. An RF line-of-sight must be maintained between the sensors and the interrogating antenna. Based on losses encountered along the RF path, the RF signal magnitude is selected to ensure that a SAW is launched from the IDT. The system wirelessly and remotely interrogates the temperature of each sensor on the rotating platform by periodically, or on command, sending an RF interrogating signal and analyzing the return echoes.

In an application where the stationary interrogating antenna is in close proximity to the rotating sensors, thereby providing a field-of-view that may be only few degrees wide, it is preferred to use a shaft position indicator to command the transmitter to transmit the very narrow (sub microsecond) RF interrogating signal or pulse every time one of the rotating sensors is in its field-of-view.

The present invention teaches a robust shaft position indicator that does not use a physical tachometer (e.g., magnetic, mechanical, optical, etc.). Instead, a software algorithm executes in a processor-based timing device of the interrogator to command the interrogator to interrogate the SAW sensors on the rotating shaft. The SAW sensor(s) can be located at any position on the rotating platform and the software algorithm will locate the sensor. As described elsewhere, the interrogator locates the SAW sensors by transmitting RF interrogating signals and analyzing the reflected signals until a reflected signal that exceeds a threshold magnitude is identified. Such a reflected signal indicates that the RF interrogating signal was received by the sensor IDT, an incident SAW was launched, a reflected SAW was generated, and a RF reflected signal was generated responsive to the reflected SAW. The interrogator then sends subsequent RF interrogating signals at the correct time to be received by the SAW sensor(s).

The algorithm is stored on a field programmable gate array (FPGA) or in a microcontroller chip. The algorithm operates on the first few sample values of the received signal that are generated at the output of the analog to digital converter before any signal processing takes place.

In one embodiment the shaft position indicator comprises a timing device that executes a threshold detection algorithm for determining a position of the moving platform. The interrogator transmits RF interrogating signals while the sensors are rotating and analyzes the RF reflected signals. When the reflected signal magnitude exceeds the threshold magnitude processing of the reflected signal is commanded as it represents a legitimate reflection from the SAW sensor and embodies characteristics of the sensor temperature. A signal magnitude below the threshold indicates that a rotating sensor was not in the field-of-view of the transmitting antenna and the RF interrogating signal when it was transmitted by the interrogator, i.e., the echo signal did not emanate from a SAW sensor.

For platforms that rotate at a constant speed, after a reference position of the moving platform has been determined based on receiving a reflected signal exceeding the threshold magnitude, the interrogator continues transmitting RF interrogating signals at a frequency determined by a speed of the rotating platform. This frequency is a fixed value that does not vary as the platform rotates only if the angular velocity is fixed. Using the time at which the reference position was established and the constant angular velocity of the rotating platform, the interrogator can then generate a synchronization signal at a determined frequency. The synchronization signal will occur once (in an application having only one rotating SAW temperature sensor) during each revolution of the rotating platform at a time when the sensor is in the field-of-view of the interrogating antenna. Responsive to the synchronization pulse, the interrogator transmits the RF interrogating signal from the antenna. The return echo can then be analyzed by the interrogator to determine a temperature of the SAW sensor and thus the temperature of a region of the rotating platform proximate the SAW sensor.

For systems with a single SAW sensor on the rotating platform one synchronization signal or pulse is generated during each revolution of the platform. For systems having two sensors on the rotating platform one synchronization pulse is generated during half revolution. For systems having four SAW sensors on the rotating platform, four synchronization pulses are generated during each revolution.

Thus preferably the number of synchronization pulses generated during each revolution of the platform is equal in number to the number of SAW sensors. Each synchronization pulse or signal triggers the generation of an RF interrogating signal and the timing of the synchronization signal ensures that the RF interrogating signals are generated at the correct time for receiving by a sensor IDT.

These multi-sensor applications determine the temperature of the rotating platform at several regions of the platform. For example, if the rotating platform comprises a gear, the temperature within several regions of the gear can be determined while it is in operation, thus permitting detailed analysis of gear integrity for use in determining when it should be replaced.

For those applications where the speed of the rotating platform is not constant, the interrogator transmits a plurality of RF interrogating signals at a frequency that is sufficient to illuminate each SAW sensor on the platform once per revolution, i.e., in those applications where the temperature is to be determined at a time interval equal to or shorter than a reciprocal of the rotational frequency as measured in rotational cycles per a given time interval. The reflected signal is analyzed and processed as a SAW reflected signal if it exceeds a threshold magnitude. The frequency at which the RF interrogating signals are transmitted may need to be adjusted as the rotational frequency of the platform changes.

Responsive to a synchronization signal, in one embodiment the interrogator generates and transmits an RF interrogating signal every time a sensor is within its field-of-view and for every sensor that appears in its field of view. The system is not free-wheeling with hits and misses at random, as in the prior art, but instead every RF interrogating signal yields a temperature reading from the aligned sensor. The invention can be used at angular speeds in excess of 100,000 RPM.

The operation and functionality of the various embodiments of the invention are further depicted in FIGS. 5-8.

Figure 5:
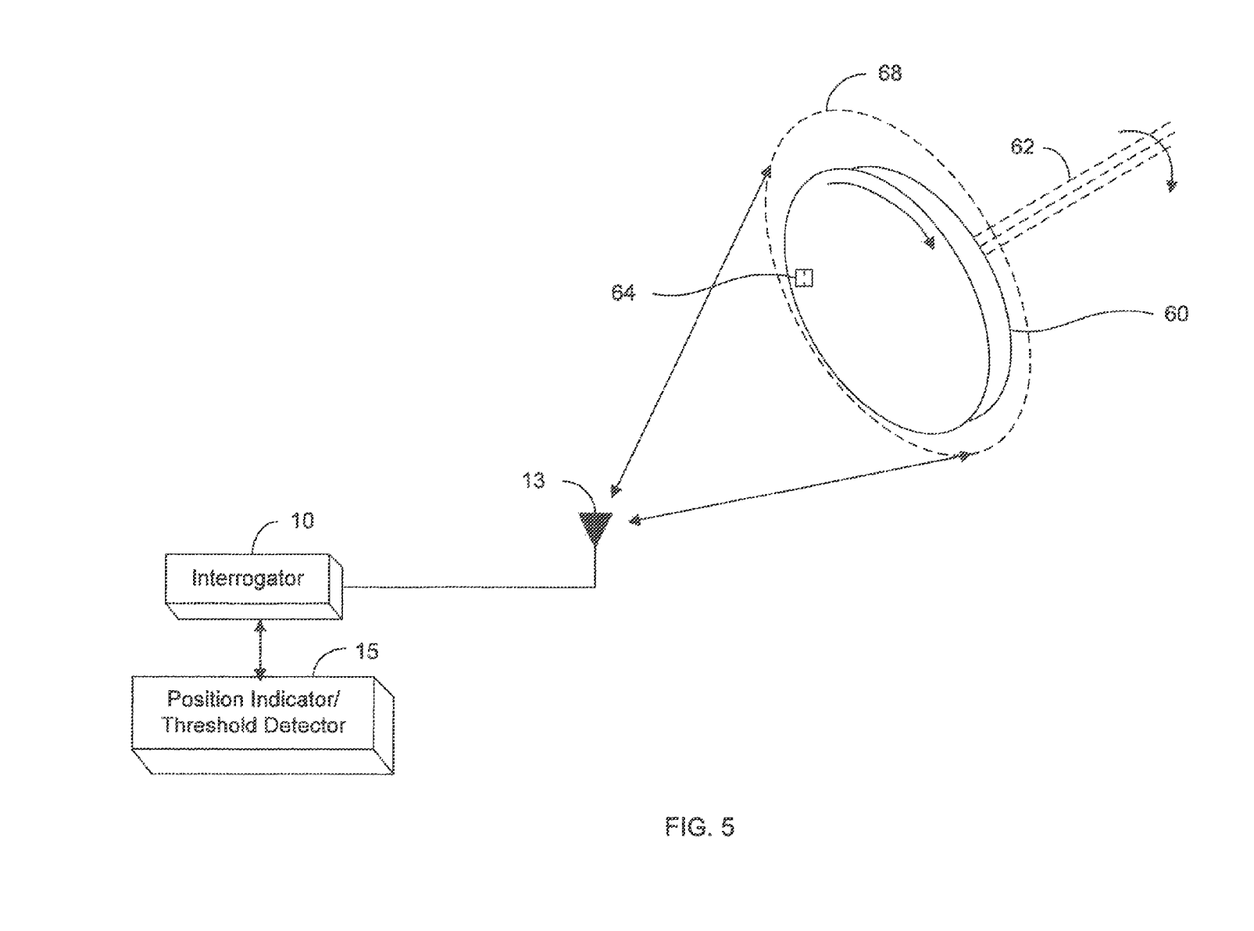
FIGS. 5 and 6 illustrate components of embodiments of the present invention for use with a rotating platform.

FIG. 5 illustrates a rotating platform 60, driven by a shaft 62, and a sensor 64 mounted on the platform 60. An antenna beam width indicated by a circle 68 encompasses the entire platform 60 and thus any RF interrogating signal transmitted from the antenna 13 is received by the sensor 64. In this embodiment a synchronization signal or pulse is not required for synchronizing the RF interrogating signal and the rotating platform 60 to ensure that the sensor 64 receives the RF interrogating signal, i.e., to ensure that the sensor 64 is within the field-of-view of the antenna 13 and the RF interrogating pulse that it transmits.

Continuing with the FIG. 5 embodiment, the RF reflected signal, responsive to the reflected surface acoustic waves, is received by the antenna 13 and analyzed by the interrogator 10 operating in conjunction with the position indicator/threshold detector 15. If a magnitude of the RF reflected signal exceeds a predetermined threshold, the RF reflected signal is deemed to have originated from the SAW sensor and represents reflected surface acoustic waves that have a characteristic related to the temperature of the platform region where the sensor is mounted.

Figure 6:
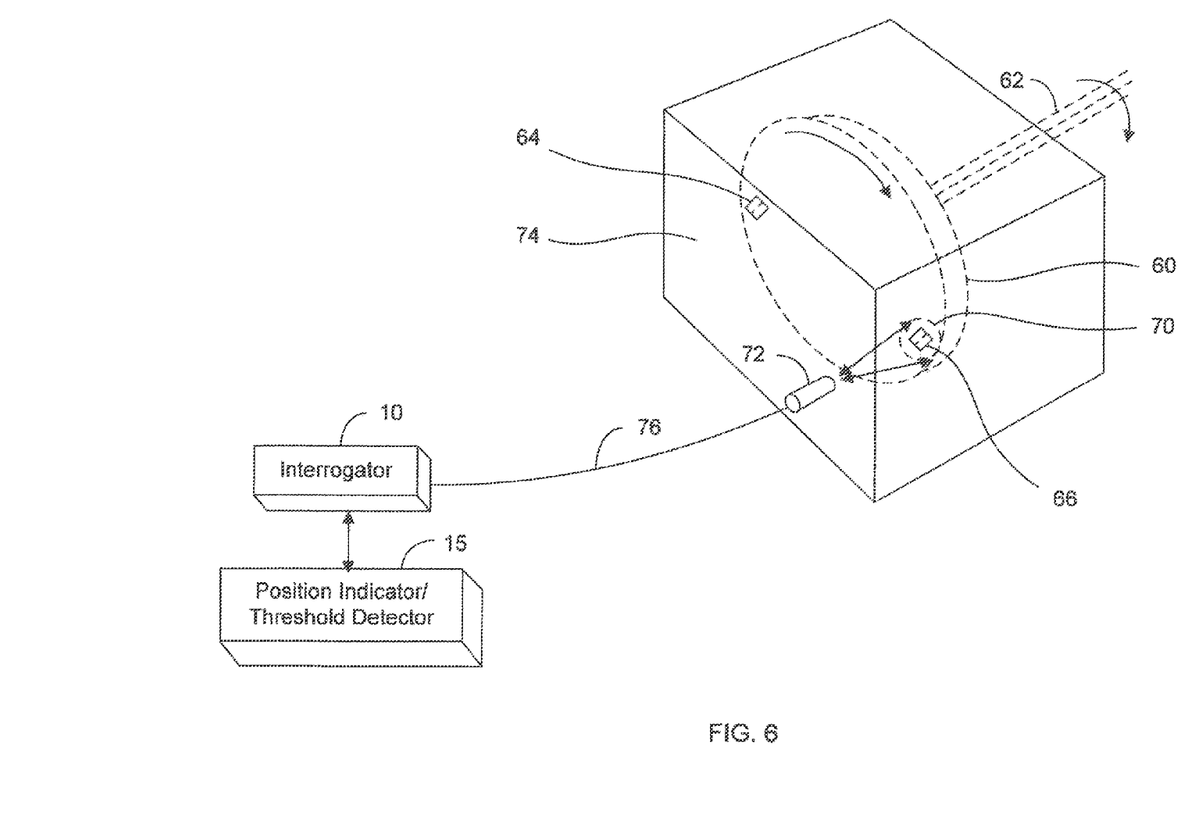

FIG. 6 illustrates an application where a beam width 70 of the interrogating signal from an antenna 72 is relatively narrow and therefore illuminates a small region of the rotating platform 60. The illuminated region is sufficiently large to encompass one of the two illustrated sensors 64 and 66, but transmission of the RF interrogating signal must be timed to ensure that one of the sensors 64 and 66 is in the field-of-view of the antenna 72 for receiving the interrogating signal that it transmits. Only when one of the sensors 64 and 66 receives the RF interrogating signal will it generate a valid SAW echo and then a valid RF reflected signal. The synchronization signal of the present invention ensures that the RF interrogating signal is properly timed relative to rotation of the SAW sensors 64 and 66.

FIG. 6 depicts the sensor 66 in a position to receive the RF interrogating signal and to generate the RF reflected signal for receiving by the antenna 72. The RF reflected signal has characteristics related to a temperature of a region of the rotating platform proximate the sensor 66.

When the rotating platform 60 rotates to place the sensor 64 within the beam of the RF interrogating signal the sensor 64 generates the reflection echo that is indicative of a temperature of a region proximate the sensor 64.

FIG. 6 further illustrates a housing 74 enclosing the rotating platform 60 and an antenna cable 76 that passes through an opening in the housing to the antenna 72.

Figure 7:
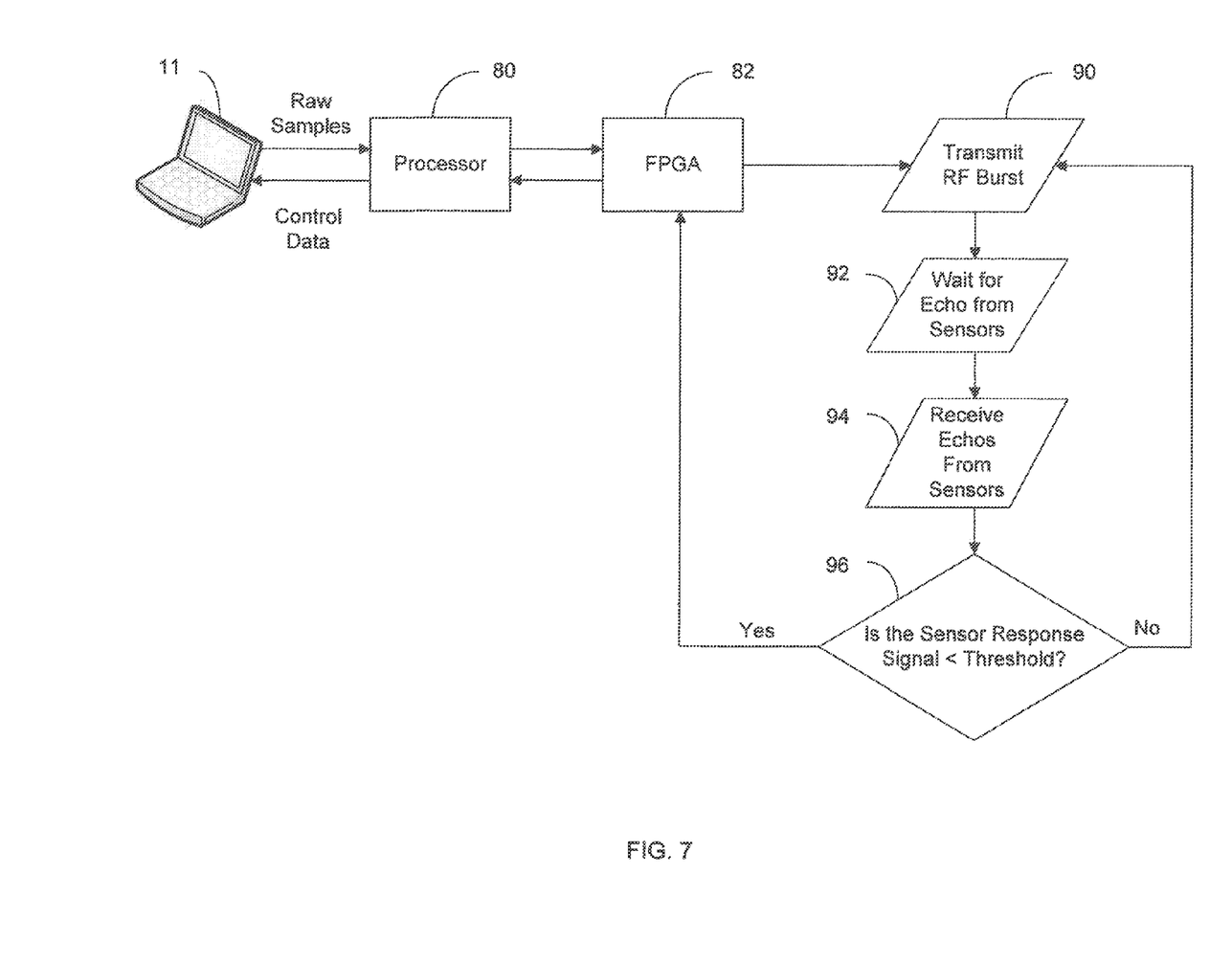
FIG. 7 illustrates a partial black diagram and a partial flowchart depicting operation of the system of the invention.

FIG. 7 illustrates a combined block diagram and flow chart according to an embodiment of the present invention in which one sensor is affixed to a rotating platform. The user controller 11 issues control signals and data to a processor 80 that in turn issues data and instructions to a field programmable gate array (FPGA) 82 that executes a program according to the teachings of the present invention.

At a step 90 the program commands the interrogator 10 (see FIG. 5) to issue an RF interrogating signal (also referred to as an RF burst). At a step 92 the interrogator 10 waits for echo returns from the SAW sensor on the on the rotating platform. The echo returns are received at a step 94 and at a decision step 96 are processed to determine if a magnitude of the sensor echo signal is greater than a predetermined threshold magnitude.

A negative answer returns processing to the step 90 for transmitting additional RF interrogating signals.

An affirmative answer sends a command to the FPGA 82 to formulate the first synchronization signal. Thereafter, for a constant-rotation platform, synchronization signals are produced at timing intervals depending on the angular velocity of the rotating platform. As described elsewhere herein, each synchronization signal triggers transmission of an RF interrogating signal that is received by a rotating SAW sensor.

In an application having two (or more) sensors, additional synchronization signals are generated and transmitted, with one synchronization signal for each sensor.

Figure 8:
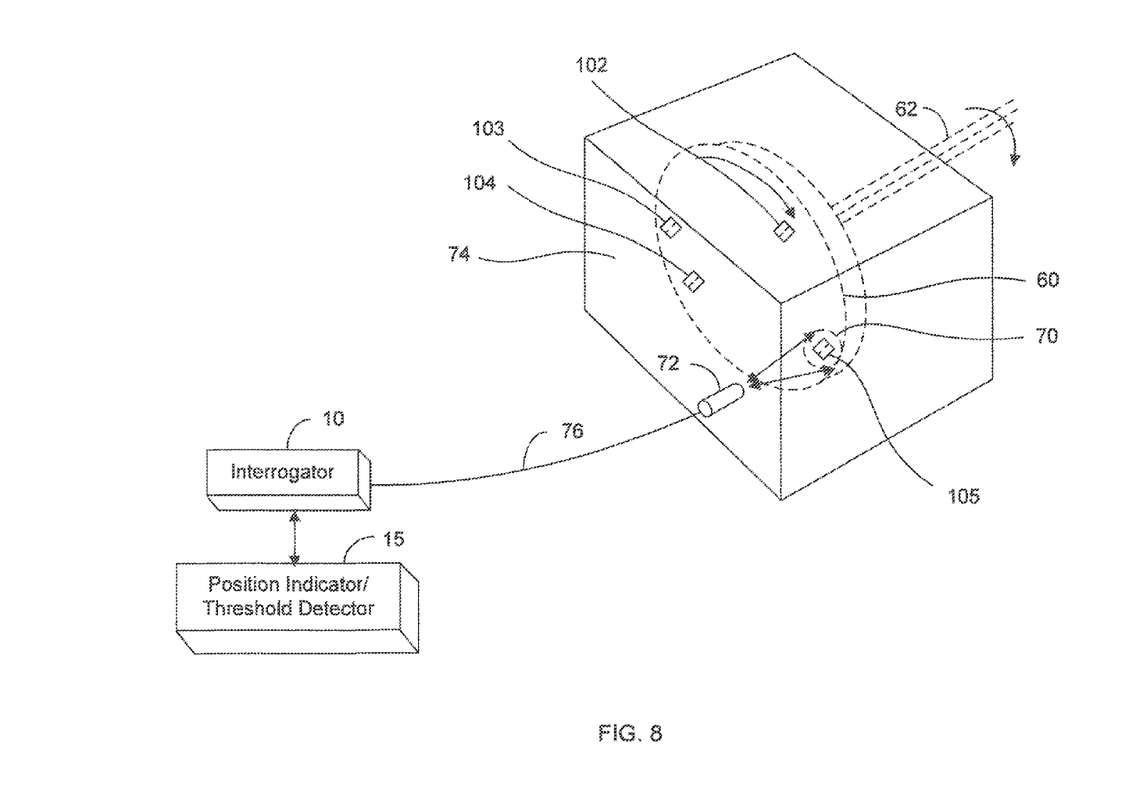
FIG. 8 illustrates four sensor embodiment of the present invention.

FIG. 8 illustrates a rotating platform 100 having four sensors 102, 103, 104 and 105 mounted thereon. The principles of the present invention can be applied to the platform 100 for generating synchronization signals and associated RF interrogating signals with one RF interrogating signal received by each sensor 102, 103, 104 and 105. The temperature at four regions of the rotating platform is thereby determined.

Although the invention has been described as generating one RF interrogating signal for each sensor for each revolution of the rotating platform, in certain applications this may not be required as it may be sufficient to measure the temperature less frequently than at every revolution of the rotating platform. For example, in some applications it may be sufficient to transmit an interrogating signal to one sensor, such as the sensor 64 of FIG. 6, during a first revolution of the platform and transmit an interrogating signal to another sensor, such as the sensor 66 of FIG. 6, during the next revolution of the platform. In this application the temperature proximate the sensors 64 and 66 will be determined on alternating revolutions of the platform. The time interval between successive temperature measurements for each sensor is then determined to be twice the reciprocal of the rotational frequency.

Other applications may transmit RF interrogating signals less frequently than every revolution and therefore the triggering synchronization signals are issued less frequently than every revolution and corresponding temperature measurements made less frequently than every revolution.

Although the present invention has been described in the context of a rotating platform, the teachings of the invention can also be applied to other moving platforms having a sensor mounted thereon where the sensor is periodically in the field-of-view of an RF interrogating signal.

Although the invention is described with reference to a synchronization signal, in certain embodiments the synchronization signal may comprise a synchronization pulse.

Although the invention has been described in the context of sensing the temperature of a rotating platform, the SAW sensors can also detect other casual influences that produce an effect on the rotating platform, such as tensile and compressive forces that distort the SAW substrate and thereby effect characteristics of the reflected or echo surface acoustic waves.

Although the invention has been described for determining temperature of a rotating platform, the invention can also be used to determine angular velocity of the platform. For example, for a platform having a single sensor, a reciprocal of the time interval between successive synchronization signals is related to the angular velocity. For a rotating platform having more than one sensor, a reciprocal of the time interval between successive synchronization signals is related to the angular velocity, but to determine the angular velocity of the rotating platform this value must be multiplied by the number of sensors.

Although the invention has been shown and described with respect to a certain preferred embodiment or embodiments, equivalent alterations and modifications may occur to others skilled in the art upon the reading and understanding of this specification and the annexed drawings. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A surface acoustic wave sensor system for use with a moving platform, comprising:
    an interrogator for producing an RF interrogating signal;
    a first antenna for transmitting the RF interrogating signal;
    a substrate attached to the moving platform for supporting surface acoustic waves;
    an interdigital transducer mounted on the substrate for producing incident surface acoustic waves responsive to the RF interrogating signal;
    a reflector mounted on the substrate for producing reflected surface acoustic waves responsive to the incident surface acoustic waves, the reflected surface acoustic waves responsive to a characteristic of the moving platform; and
    a position indicator for producing a synchronization signal input to the interrogator for triggering the RF interrogating signal, the synchronization signal timed to trigger the RF interrogating signal when the interdigital transducer is within a field-of-view of the first antenna.

2. The surface acoustic wave sensor system of claim 1 wherein the first antenna comprises any one of a monopole antenna, a dipole antenna, and a patch antenna.

3. The surface acoustic wave sensor system of claim 1 wherein the position indicator comprises a threshold detector, and wherein the interrogator transmits a serial plurality of RF interrogating signals, each one of the RF interrogating signals received at the moving platform and generating an RF reflected signal received by the first antenna, the threshold detector responsive to each one of the RF reflected signals for determining RF reflected signals that exceed a predetermined threshold, the synchronization signal responsive to the RF reflected signals that exceed the predetermined threshold.

4. The surface acoustic wave sensor system of claim 1 wherein the synchronization signal comprises a synchronization pulse.

5. The surface acoustic wave sensor system of claim 4 wherein the moving platform comprises a rotating platform and a frequency of synchronization pulses is related to an angular velocity of the rotating platform.

6. The surface acoustic wave sensor system of claim 1 wherein the moving platform comprises a rotating gear.

7. The surface acoustic wave sensor system of claim 1 further comprising a second antenna electrically connected to the interdigital transducer for receiving the RF interrogating signal, the second antenna bonded to the substrate.

8. The surface acoustic wave sensor system of claim 7 wherein the second antenna comprises any one of a monopole antenna, a dipole antenna, or a patch antenna.

9. The surface acoustic wave sensor system of claim 1 wherein the position indicator comprises a timing device for producing the synchronization signal responsive to a reference position and speed of the moving platform.

10. The surface acoustic wave sensor system of claim 9 wherein the moving platform comprises a rotating platform and the synchronization signal is responsive to a reference position and an angular velocity of the rotating platform.

11. The surface acoustic wave sensor system of claim 1 wherein a characteristic of the moving platform comprises any one of a temperature of the moving platform and forces applied to the moving platform.

12. The surface acoustic wave sensor system of claim 1 wherein the position indicator produces the synchronization signal periodically or in response to a command.

13. The surface acoustic wave sensor system of claim 1 wherein the moving platform comprises a rotating platform rotating at a constant rotational speed, the position indicator for determining a reference position of the rotating platform and for producing a synchronization signal responsive to the reference position and an angular velocity of the rotating platform.

14. The surface acoustic wave sensor system of claim 1 wherein the moving platform comprises a rotating platform rotating at a variable speed, the interrogator for transmitting a plurality of RF interrogating signals at a frequency sufficient to illuminate a second antenna electrically connected to the interdigital transducer at a rate of at least once per revolution, each reflected surface acoustic wave compared to a predetermined threshold and if the reflected surface acoustic wave exceeds the threshold, the reflected surface acoustic wave is processed to determine the characteristic of the rotating platform.

15. The surface acoustic wave sensor of claim 1 further comprising a plurality of substrates attached to the moving platform and an equal plurality of interdigital transducers and reflectors mounted thereon, each reflected surface acoustic wave responsive to a characteristic of the moving platform proximate the reflector that generated the reflected surface acoustic wave.

16. A surface acoustic wave temperature sensor for use with a rotating platform, comprising;
    an interrogator for producing an RF interrogating pulse;
    a first antenna for transmitting the RF interrogating pulse;
    a second antenna for receiving the RF interrogating pulse;
    a substrate attached to the moving platform for supporting surface acoustic waves;
    an interdigital transducer mounted on the substrate and electrically connected to the second antenna for producing incident surface acoustic waves responsive to the RF interrogating pulse;
    a reflector mounted on the substrate for producing reflected surface acoustic waves responsive to the incident surface acoustic waves, the reflected surface acoustic waves having characteristics responsive to a characteristic of the rotating platform; and
    a position indicator for producing a synchronization pulse input to the interrogator for triggering the RF interrogating pulse when the first antenna is within a field-of-view of the second antenna.

* * * * *